United States Patent
Matsuzaki et al.

(10) Patent No.: US 6,219,482 B1
(45) Date of Patent: Apr. 17, 2001

(54) METALLIC TUBES FOR HOUSING OPTICAL FIBERS AND PROCESS FOR PRODUCING THE SAME

(75) Inventors: Akira Matsuzaki; Yoshiharu Sugimoto; Masaru Sagiyama, all of Tokyo; Yasunori Yoshie, Kawasaki, all of (JP)

(73) Assignee: Helios Inc., Kanagawa-ken (JP)

( * ) Notice: Subject to any disclaimer, the term of this patent is extended or adjusted under 35 U.S.C. 154(b) by 0 days.

(21) Appl. No.: 09/194,574

(22) PCT Filed: Apr. 15, 1998

(86) PCT No.: PCT/JP98/01723

§ 371 Date: Nov. 27, 1998

§ 102(e) Date: Nov. 27, 1998

(87) PCT Pub. No.: WO98/47033

PCT Pub. Date: Oct. 22, 1998

(30) Foreign Application Priority Data

| Apr. 15, 1997 | (JP) | 9-097181 |
| Apr. 15, 1997 | (JP) | 9-097182 |
| Apr. 15, 1997 | (JP) | 9-097183 |
| Apr. 15, 1997 | (JP) | 9-097184 |
| Apr. 15, 1997 | (JP) | 9-097185 |
| Apr. 15, 1997 | (JP) | 9-097186 |
| Jul. 28, 1997 | (JP) | 9-201548 |
| Jul. 28, 1997 | (JP) | 9-201549 |

(51) Int. Cl.⁷ ...................................................... G02B 6/44
(52) U.S. Cl. ............................ 385/100; 385/106; 385/101
(58) Field of Search ............................... 385/100–114; 174/40 R, 41, 78

(56) References Cited

U.S. PATENT DOCUMENTS 4,908,261   3/1990   Ishii et al. ................... 428/216
5,555,338 * 9/1996   Haag et al. ................... 385/101

FOREIGN PATENT DOCUMENTS

| 672 141 A5 | 10/1989 | (CH) . |
| 8-69716 | 3/1966 | (JP) . |
| 54-134449 | 10/1979 | (JP) . |
| 57-192905 | 11/1982 | (JP) . |
| 01061710 | 3/1989 | (JP) . |
| 7-302519 | 11/1995 | (JP) . |
| 8-180746 | 7/1996 | (JP) . |

* cited by examiner

Primary Examiner—Phan T. H. Palmer
(74) Attorney, Agent, or Firm—Nixon & Vanderhye

(57) ABSTRACT

Disclosed is an optical fiber-housing metal pipe, comprising a base body of an optical fiber-housing metal pipe, an aluminum layer formed on the surface of the base body, and an oxide layer formed on the aluminum layer, the oxide layer serving to improve the corrosion resistance and wear resistance of the optical fiber-housing metal pipe.

Also disclosed is an optical fiber-housing metal pipe comprising a base body of an optical fiber-housing metal pipe, an Al-X alloy layer formed on the surface of the base body, where X is one or two kinds of elements selected from the group consisting of Mn, Ti, Ni, Cr, Nb, Mg, Fe, In and Sn, or an Al-based composite layer containing at least one kind of a material selected from the group consisting of a carbide, an oxide and an organic compound.

Further, the present invention provides a method of manufacturing an optical fiber-housing metal pipe excellent in corrosion resistance, comprising the step of forming an aluminum or aluminum alloy layer on the surface of a base body of an optical fiber-housing metal pipe, and the step of smoothing the aluminum or aluminum alloy layer to set a maximum height ($R_y$) of the aluminum or aluminum alloy layer at 3 $\mu$m or less.

28 Claims, 1 Drawing Sheet

METALLIC TUBES FOR HOUSING OPTICAL FIBERS AND PROCESS FOR PRODUCING THE SAME

TECHNICAL FIELD

The present invention relates to a metal pipe for housing an optical fiber and, in some cases, a loading material such as a water-sealed compound and a method of manufacturing the same, particularly, to an optical fiber-housing metal pipe having the surface covered with an aluminum layer exhibiting a corrosion resistance and further covered with an oxide layer exhibiting a wear resistance and a further improved corrosion resistance and to a method of manufacturing the same. The present invention also relates to an optical fiber-housing metal pipe having the surface covered with an aluminum alloy layer or an aluminum composite layer exhibiting a corrosion resistance and a wear resistance, and to an optical fiber-housing metal pipe having the surface covered with an aluminum or aluminum alloy layer exhibiting a corrosion resistance and having the surface of the aluminum or aluminum alloy layer smoothed so as to decrease the surface defect and to further improve the corrosion resistance, and to a manufacturing method thereof.

BACKGROUND ART

As shown in, for example, FIGS. 1A, 1B and 1C, a metal pipe 2 housing an optical fiber 3 is stranded together with conductive wires 1 so as to provide an optical grounding wire.

Specifically, FIG. 1A shows an optical grounding wire prepared by concentrically stranding a plurality of conductive wires 1 around the metal pipe 2 housing the optical fiber 3. FIG. 1B shows an optical grounding wire prepared by forming a first layer consisting of a plurality of conductive wires 1 and a plurality of metal pipes 2 each housing the optical fiber 3 to surround an inner core 4 in the form of a metal wire consisting of, for example, steel, aluminum, etc. and concentrically stranding a plurality of additional conductive wires 1 to surround the first layer. Further, FIG. 1C shows an optical grounding wire prepared by forming a first layer consisting of a plurality of conductive wires 1 and a metal pipe 2 housing the optical fiber 3 to surround the conductive wire 1 acting as a core and concentrically stranding a plurality of additional conductive wires 1 to surround the first layer.

The metal pipe housing the optical fiber is prepared by a simultaneous insertion method in which a metal tape is formed into a tubular form and, at the same time, the optical fiber 3 is supplied so as to be loaded in the tubular body and, then, the seam of the tubular body is bonded. Alternatively, the metal pipe housing the optical fiber is prepared by an after-insertion method in which the optical fiber is inserted from the end portion into the metal pipe prepared in advance. In general, the metal pipe is prepared by using a stainless steel, copper, a copper alloy, etc. in view of the required mechanical strength, workability and corrosion resistance of the metal pipe.

In the conventional technique, a corrosion problem is brought about by a difference in ionization tendency between the metal constituting the metal pipe 2 and the metal constituting the conductive wire 1, e.g., aluminum or aluminum alloy.

A measure for overcoming the difficulty is disclosed in, for example, Japanese Patent Publication (Kokoku) No. 63-10805 or Japanese Patent Disclosure (Kokai) No. 8-69716. These prior arts teach that the outer surface of the metal pipe housing the optical fiber should be covered with a metal layer. To be more specific, JP '805 teaches that a metal layer consisting of, for example, aluminum is formed to cover the outer surface of the metal pipe housing the optical fiber by means of vacuum plating such as vacuum vapor deposition, sputtering, or ion plating.

On the other hand, JP '716 teaches a sintering method in which a metal powder is sintered on the outer surface of a metal pipe housing an optical fiber, or a chemical or electrochemical metal plating method utilizing electrolysis for forming an aluminum or aluminum alloy layer to cover the outer surface of the metal pipe.

Where the metal pipe housing an optical fiber is stranded together with conductive wires to provide an optical grounding wire, wear is brought about between the metal pipe housing the optical fiber and the conductive wires around the metal pipe because of the elongation-shrinkage of the pipe and wires caused by vibration or temperature change. Particularly, where a metal layer is formed to surround the outer surface of the metal pipe housing the optical fiber, required is a high wear resistance exceeding the level in the ordinary steel plate plating, making it necessary to determine the thickness of the metal layer in view of the wear. According to the research conducted by the present inventors, it has been found that required is a metal layer having a thickness exceeding 30 $\mu$m.

In JP '805 and JP '716, however, no consideration is given to the wear of the metal layer and to the adhesion properties and productivity of the metal layer. Further, if an aluminum layer having a thickness exceeding 30 $\mu$m is simply formed without taking any measure in the film forming method disclosed in these prior arts and in the other known film forming methods, the aluminum layer is hardly adhered to the base body of the metal pipe, resulting in failure to achieve a sufficient productivity such as a production efficiency and yield.

Also, where a metal layer is formed to cover the outer surface of the metal pipe housing the optical fiber, a surface defective portion is unavoidably formed on the metal layer in forming the metal layer. What should be noted is that a corrosion derived from a difference in ionization tendency between the base body of the metal pipe housing the optical fiber and the plated metal is generated in the surface defective portion. In order to overcome the corrosion problem, it is effective to increase the thickness of the metal layer. However, the present inventors have found that, for overcoming the corrosion problem by increasing the thickness of the metal layer, it is necessary to form the metal layer in a thickness exceeding 30 $\mu$m, as already pointed out. Any of JP '805 and JP '716 does not refer to the defect of the metal layer. Also, if the metal layer is formed in a thickness exceeding 30 $\mu$m, the productivity is lowered and the adhesion of the metal layer to the base body of the metal pipe is markedly lowered, as already pointed out. If the metal layer is poor in adhesion properties, the metal layer readily peels off so as to expose the base body of the metal pipe to the outside. It follows that, even if an aluminum or aluminum alloy layer of an optional thickness is formed to cover the surface of the metal pipe, the base body of the metal pipe is exposed to the outside, resulting in failure to obtain a sufficient corrosion resistance.

The present invention, which has been achieved in view of the problems described above, is intended to provide an optical fiber-housing metal pipe having the surface covered with an aluminum layer and further covered with an oxide layer exhibiting a wear resistance and a corrosion resistance, to provide an optical fiber-housing metal pipe having the surface covered with an aluminum alloy layer or an aluminum composite layer exhibiting a corrosion resistance and a wear resistance, and to provide an optical fiber-housing metal pipe having the surface covered with an aluminum or aluminum alloy layer exhibiting an corrosion resistance and having the surface of the aluminum or aluminum alloy layer smoothed so as to decrease the surface defect and to further improve the corrosion resistance, and a manufacturing method thereof.

DISCLOSURE OF INVENTION (1) The present invention provides an optical fiber-housing metal pipe, comprising a base body of the metal pipe, an aluminum layer surrounding the surface of the base body, and an oxide layer covering the aluminum layer and exhibiting a corrosion resistance and a wear resistance.

It is desirable for the aluminum layer to have a thickness of 3 to 30 μm. It is also desirable for the oxide layer to be selected from the group consisting of a chromate-treated film, a zinc phosphate film, and an anodic oxidation film.

Further, it is desirable for the chromate-treated film to contain resin and/or oxide sol and have a metal chromium deposition amount of 20 to 400 mg/m$^2$. Also, the deposition amount of the zinc phosphate film should desirably be 0.5 to 8 g/m$^2$. Further, the anodic oxidation film should desirably have a thickness of 3 to 10 μm. It is also possible to change the coloring paint adsorbed on the surface of the anodic oxidation film. Further, it is desirable to apply a pore-sealing treatment to the anodic oxidation film.

Where the optical fiber-housing metal pipe is made of a stainless steel, it is desirable to form a nickel layer in a thickness of 0.02 to 2.5 μm so as to be positioned inside the aluminum layer.

(2) The present invention also provides an optical fiber-housing metal pipe, comprising a base body of the metal pipe and an Al-X alloy layer surrounding the outer surface of the base body, where X is one or two of the metals selected from the group consisting of Mn, Ti, Ni, Cr, Nb, Mg, Fe, In and Sn. It is desirable for the Al-X alloy layer to have a thickness of 3 to 30 μm. Further, where the base body of the metal pipe is made of a stainless steel, it is desirable to form a nickel layer in a thickness of 0.02 to 2.5 μm inside the Al-X alloy layer.

(3) The present invention also provides. an optical fiber-housing metal pipe, comprising a base body of the metal pipe, and a composite layer formed to surround the outer surface of the base body of the metal pipe. The composite layer contains Al as a main component and at least one auxiliary component selected from the group consisting of a carbide, an oxide and an organic compound. It is desirable for the composite layer to have a thickness of 3 to 30 μm. Further, where the base body of the optical fiber-housing metal pipe is made of a stainless steel, it is desirable to form a nickel layer in a thickness of 0.02 to 2.5 μm inside the composite layer.

(4) The present invention also provides an optical fiber-housing metal pipe, comprising a base body of the metal pipe made of a stainless steel, a nickel layer formed to cover the stainless steel base body, and an aluminum layer formed to cover the nickel layer. The nickel layer should desirably have a thickness of 0.02 to 2.5 μm.

(5) The present invention also provides a method of manufacturing an optical fiber-housing metal pipe exhibiting an excellent corrosion resistance, comprising the step of forming an aluminum or aluminum alloy layer to cover the surface of a base body of an optical fiber-housing metal pipe, and the step of smoothing the aluminum or aluminum alloy layer.

The smoothing step represents a step of drawing the metal pipe. It is desirable to draw the metal pipe to permit the outer diameter of the metal pipe to be reduced by 0.05 to 0.8%.

(6) The optical fiber-housing metal pipe of the present invention is featured in that the aluminum or aluminum alloy layer covering the surface of the base body of the metal pipe has a maximum height ($R_y$) of 3 μm or less.

Also, the aluminum or aluminum alloy layer should desirably have a thickness of 7 to 30 μm. Further, where the base body of the optical fiber-housing metal pipe consists of a stainless steel, it is desirable to form a nickel layer in a thickness of 0.02 to 2.5 μm inside the aluminum or aluminum alloy layer. In addition, it is desirable to form a chromate-treated film on the upper surface of the aluminum or aluminum alloy layer.

Incidentally, it is possible to arrange a plurality of stranded conductive wires around the optical fiber-housing metal pipe defined in items (1), (2), (3), (4) and (6) above so as to provide an optical grounding wire.

BEST MODE OF CARRYING OUT THE INVENTION

Figure 1A:
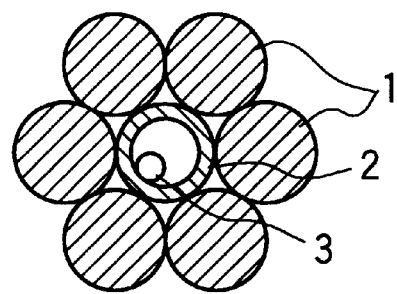
FIG. 1A is a cross sectional view exemplifying that a metal pip ousing an optical fiber and conductive wires are stranded together.

As a result of an extensive research conducted in an attempt to overcome the above-noted problems, the present inventors have arrived at an optical fiber-housing metal pipe excellent in corrosion resistance and wear resistance. The metal pipe is covered with an aluminum layer. Further, an oxide layer exhibiting a corrosion resistance and a wear resistance is formed to cover the aluminum layer. Alternatively, the base body of the optical fiber-housing metal pipe is covered with an aluminum alloy layer or an aluminum composite layer exhibiting a corrosion resistance and wear resistance. Where an optical grounding wire is prepared by stranding together the optical fiber-housing metal pipe together with conductive. wires, the wear of the metal pipe caused by the mechanical contact with the conductive wires is suppressed by the presence of the oxide layer, the aluminum layer or the aluminum composite layer covering the surface of the base body of the metal pipe. Further, the aluminum or aluminum alloy layer covering the surface of the metal pipe base body is smoothed to permit a maximum height ($R_y$) of the aluminum or aluminum alloy layer to fall within a predetermined range so as to decrease the surface defect of the metal pipe and, thus, to further improve the corrosion resistance of the metal pipe. The present invention also provides a method of manufacturing the particular metal pipe housing an optical fiber.

Let us describe some embodiments of the present invention.

First Embodiment

An optical fiber-housing metal pipe according to the first embodiment of the present invention comprises a base body of the metal pipe, an aluminum layer covering the surface of the base body, and an oxide layer covering the surface of the aluminum layer. The particular construction permits suppressing corrosion derived from a difference in ionization tendency between the optical fiber-housing metal pipe and conductive wires stranded together with the metal pipe.

Even if covered with an oxide film exhibiting an excellent corrosion resistance and wear resistance, the aluminum layer should have a thickness of at least 3 $\mu$m. If the thickness of the aluminum layer is less than 3 $\mu$m, scratches or wear reaching the base body of the metal pipe takes place. Naturally, it is desirable for the thickness of the aluminum layer to have a thickness of at least 3 $\mu$m. On the other hand, the aluminum layer of a large thickness is advantageous in corrosion resistance and wear resistance. However, the adhesion is lowered with increase in thickness of the aluminum layer. It follows that it is desirable for the thickness of the aluminum layer not to exceed 30 $\mu$m. If the thickness is lower than 30 $\mu$m, it is possible to suppress an increase in the manufacturing cost while maintaining a high corrosion resistance and a high wear resistance.

The method of forming the aluminum layer is not particularly limited in the present invention. Specifically, it is possible to employ a dry process such as a vacuum vapor deposition method or an ion plating method, and a wet process such as an electroplating method or a melt plating method.

The oxide film used in the present invention includes, for example, an aluminum oxide film, a chromium oxide film, a zinc oxide film and a lithium oxide film. The method of forming the oxide film is not particularly limited. Since the oxide film has a hardness higher than that of an aluminum film, the wear of the aluminum layer can be alleviated even if the aluminum layer is rubbed with the conductive wire within the optical grounding wire. Also, the oxide film exhibits barrier properties relative to corrosive factors such as chlorine ions, making it possible to markedly improve the corrosion resistance of the aluminum layer. Particularly, the oxide film formed by a chromate treatment, a zinc phosphate treatment and anodic oxidation exhibits excellent properties in productivity, economy and wear resistance.

Let us describe various oxide films, as follows:

a. Chromate-Treated Film

A method of forming a chromate-treated film is not particularly limited. If a chromium oxide film can be formed on the outermost surface of the aluminum layer, it is possible to use any of a reaction type chromate, a coating type chromate and an electrolytic chromate.

It should also be noted that, if the chromate-treated layer is allowed to contain at least one of resin and an oxide sol, the barrier properties of the chromate-treated layer itself can be increased, leading to a further improved corrosion resistance. At the same time, lubricity can be imparted to the chromate-treated layer itself so as to lower the friction coefficient between the optical fiber-housing metal pipe and the conductive wires. As a result, wear of the conductive wire as well as the metal layer can be prevented. The resin contained in the chromate treated layer is not particularly limited as far as the resin can be stably mixed with the chromate treating solution containing mainly chromic acid. For example, the resin includes acrylic resin, polyester resin, styrene resin, polyethylene resin, epoxy resin, polyurethane resin, and denatured resins thereof which are soluble in water and can form an aqueous emulsion resin. Also, the oxide sol contained in the chromate treated layer is not particularly limited and includes, for example, alumina sol, titanium compound sol, zirconia sol, and silica sol.

The chromium deposition amount of the chromate-treated layer should be at least 20 mg/m$^2$ in terms of the metal chromium in order to obtain the effect of improving the corrosion resistance and wear resistance. However, it is more desirable for the chromium deposition amount to be at least 40 mg/m$^2$ in view of the requirement in the optical grounding wire article. The effect of improving the corrosion resistance and wear resistance can be increased with increase in the chromium deposition amount. However, if the chromium deposition amount exceeds 400 mg/m$^2$ in terms of the metal chromium, the productivity and life of the treating solution are markedly lowered. In other words, the upper limit of the chromium deposition amount should desirably be 400 mg/m$^2$.

Where a plurality of optical fiber-housing metal pipes are arranged in an optical grounding wire, it is possible to color the chromate-treated layer, as required, so as to facilitate distinction of the optical fiber-housing metal pipes in joining the optical fibers. For example, if the chromate-treated layer is dipped in a mixed solution containing chromic acid, tungstic acid, and sodium fluoride, the chromate-treated layer is colored yellowish. Also, the chromate-treated layer is colored greenish if dipped in a mixed solution containing chromic acid, phosphoric acid and acidic sodium fluoride.

The relationship between the kind of the chromate treating solution and the coloring of the chromate-treated layer is known to the art, making it possible for those skilled in the art to select appropriately the chromate treating solution depending on the desired color.

b. Zinc Phosphate Film

A zinc phosphate film can be formed if the aluminum layer is dipped in a solution containing phosphate ions and zinc ions. The deposition amount should desirably be at least 0.5 g/m$^2$ in order to obtain a prominent effect of improving the corrosion resistance and wear resistance, and should desirably be at most 8.0 g/m$^2$ in view of the productivity and the life of the treating solution. Further, it is possible to apply a chromium sealing treatment after the zinc phosphate treatment in order to obtain a further improved corrosion resistance.

c. Anodic Oxidation Film

An anodic oxidation film permits improving the wear resistance and, at the same time, produces a barrier effect for protecting the aluminum layer and the base body of the metal pipe from corrosive factors such as Cl$^-$ so as to further improve the corrosion resistance. The method of forming the anodic oxidation film is not particularly limited. For example, the anodic oxidation film can be formed by dipping the metal pipe in an acidic bath containing, for example, sulfuric acid or oxalic acid, or a basic bath containing sodium phosphate. Also, a more stable hydrated oxide can be formed by applying a pore-sealing treatment to the anodic oxidation film so as to further improve the corrosion resistance. The pore-sealing method employed in the present invention is not particularly limited. For example, the pore-sealing treatment can be performed by allowing the anodic oxidation film to be brought into contact with or to be dipped in a pressurized steam or a boiling water.

The anodic oxidation film should desirably have a thickness of at least 3 $\mu$m in order to obtain a prominent effect of improving the corrosion resistance and wear resistance. If the film thickness is unduly increased, however, the productivity is lowered. In addition, the thickness of the aluminum layer is decreased so as to decrease the effect of suppressing the corrosion occurring at the interface between different metals. Such being the situation, the thickness of the anodic oxidation film should desirably be at most 10 $\mu$m.

Where a plurality of optical fiber-housing metal pipes are arranged in an optical grounding wire, it is possible to color the anodic oxidation film, as required, by adsorption of a colored paint on the surface of the anodic oxidation film so as to facilitate distinction of the optical fiber-housing metal pipes in joining the optical fibers. For example, if the anodic oxidation treatment is performed by using a solution containing sulfuric acid or chromic acid, the anodic oxidation film is colored gray. If the treatment is carried out by using a solution containing oxalic acid, the anodic oxidation film is colored yellow. Further, if the treatment is performed by using a solution containing sodium phosphate, the anodic oxidation film is colored opaque white. The relationship between the kind of the anodic oxidation treating solution and the coloring of the anodic oxidation film is known to the art, making it possible for those skilled in the art to select appropriately the anodic oxidation treating solution depending on the desired color of the anodic oxidation film.

For the coloring in colors other than those described above, the optical fiber-housing metal pipe having an anodic oxidation film formed thereon can be dipped in an aqueous solution of a dye or pigment of a desired color. In this case, the dye or pigment is adsorbed on the fine pores of the anodic oxidation film so as to achieve the desired coloring.

It is also possible to apply an electrolysis to the optical fiber-housing metal pipe having an anodic oxidation film formed thereon within an aqueous solution containing metal salts, i.e., salts of Ni, Cu, Se, Mn, etc. In this case, the metal or metal compound is precipitated at the bottom of the fine pores of the anodic oxidation film so as to achieve the desired coloring. For example, in the case of using an aqueous solution of a Ni salt, the anodic oxidation film is colored bronze. In the case of using an aqueous solution of a Cu salt, the anodic oxidation film is colored black to pink. In the case of using an aqueous solution of a Se salt, the anodic oxidation film is colored yellowish brown. Further, in the case of using an aqueous solution of a Mn salt, the anodic oxidation film is colored mustard. The relationship between the precipitated metal compound and the coloring of the anodic oxidation film is known to the art, making it possible for those skilled in the art to select appropriately the required metal compound for achieving a desired coloring.

It is possible to apply a pore-sealing treatment to the colored optical fiber-housing metal pipe so as to close the fine pores of the anodic oxidation film by means of the volume expansion caused by the hydration reaction. As a result, the adsorbed colored paint is sealed within the pore. It follows that the color tone is unlikely to be deteriorated with time.

The base body of the metal pipe is not particularly limited in the present invention. Specifically, various metals such as stainless steel, copper and copper alloy can be selected appropriately in view of the various properties required such as mechanical strength, workability, corrosion resistance and cost. In the case of using stainless steel, the outer aluminum film is likely to peel off by the rubbing of the stainless steel base body with the conductive wire within the optical grounding wire used as an overhead wire. To be more specific, since the optical fiber-housing metal pipe receives a high tension within the overhead wire, the aluminum film included in the metal pipe is required to exhibit an adhesion higher than that in the ordinary plated steel plate.

On the other hand, a passive film is present on the outermost surface of a stainless steel pipe, with the result that the adhesion of the aluminum layer to the stainless steel pipe tends to be lowered. To overcome this difficulty, it is desirable to form a nickel layer on the stainless steel pipe so as to suppress the effect of the passive film, followed by forming an aluminum layer on the nickel layer so as to ensure a high adhesion of the aluminum layer. The method of forming the nickel layer is not particularly limited in the present invention. For example, it is possible to employ a wet process such as an electroless plating or an electrolytic plating. However, it is more desirable to apply a pH-controlled plating bath such as a strike bath or a borofluoride bath. In this case, the nickel layer is formed while eluting the passive film on the surface of the stainless steel pipe, with the result that the nickel layer itself is formed to exhibit a higher adhesion. In practice, if an aluminum layer is formed in direct contact with the stainless steel pipe without forming a nickel layer, the aluminum layer substantially fails to exhibit an adhesion, making it impossible to put the stainless steel pipe including the aluminum layer to practical use.

The thickness of the nickel layer is not particularly limited in the present invention. However, it is desirable for the nickel layer to have a thickness of at least 0.02 $\mu$m in order to allow the aluminum layer formed on the nickel layer to exhibit a satisfactory adhesion. On the other hand, if the thickness of the nickel layer exceeds 2.5 $\mu$m, the passive film on the surface of the stainless steel pipe is eluted excessively, with the result that the corrosion resistance of the stainless steel pipe itself is markedly deteriorated. It follows that the thickness of the nickel layer should desirably fall within a range of between 0.02 $\mu$m and 2.5 $\mu$m.

Second Embodiment

The optical fiber-housing metal pipe according to a second embodiment of the present invention comprises an aluminum alloy layer or an aluminum composite layer formed on the outer surface of the optical fiber-housing metal pipe so as to suppress the corrosion occurring at the interface between different metals, i.e., between the metal pipe and the conductive wire surrounding the metal pipe.

Let us describe more in detail each of the layers noted above.

a. Aluminum Alloy Layer

An aluminum alloy layer is intended to improve the corrosion resistance and wear resistance.

The component X of the aluminum alloy Al-X should desirably be one or two metals selected from the group consisting of Mn, Ti, Ni, Cr, Nb, Mg, Fe, In and Sn, which form a dense native oxide film. If these metals and aluminum are alloyed, the resultant alloy film exhibits excellent corrosion resistance and wear resistance, compared with the pure aluminum film. The amounts (% by weight) of these alloy components of Mn, Ti, Ni, Cr, Nb, Mg, Fe, In and Sn should be as follows:

0.5% $\leq$ Mn $\leq$ 50%;
0.1% $\leq$ Ti $\leq$ 80%;
0.05% $\leq$ Ni $\leq$ 40%;
1.0% $\leq$ Cr $\leq$ 30%;
1.0% $\leq$ Nb $\leq$ 30%;
0.1% $\leq$ Mg $\leq$ 70%;
0.05% $\leq$ Fe $\leq$ 20%;
0.05% $\leq$ In $\leq$ 1.0%; and
0.05% $\leq$ Sn $\leq$ 1.0%.

If the addition amounts of these alloy components X are lower than the lower limits noted above, it is impossible to obtain a sufficient wear resistance. If the addition amounts exceed the upper limits noted above, however, the corrosion resistance of the aluminum alloy tends to be lowered. The method for forming the aluminum alloy layer includes, for example, a vacuum plating method such as a vacuum vapor deposition method or an ion plating method, and an electroplating method using a molten salt bath or an organic solvent bath.

The aluminum alloy layer should desirably have a thickness of at least 3 μm in view of the corrosion resistance and the wear resistance. If the thickness is lower than 3 μm, scratches or wear reaching the metal pipe base body takes place in the aluminum alloy layer. On the other hand, if the thickness exceeds 30 μm, the adhesion of the aluminum alloy layer is markedly lowered. As described previously, it is desirable in economy, too, to set the thickness of the aluminum alloy layer to fall within a range of between 3 μm and 30 μm, because the manufacturing cost can be suppressed while maintaining satisfactory corrosion resistance and wear resistance.

It is also desirable to apply a chemical treatment or an anodic oxidation treatment to the surface of the aluminum alloy layer so as to form a chromate film, a zinc phosphate film, etc. on the surface of the aluminum alloy layer. In this case, the corrosion resistance is improved, and a wear resistance is imparted.

Where the aluminum alloy layer contains In or Sn, it is also possible to suppress a clearance corrosion occurring at the contact portion between the conductive wire and the optical fiber-housing metal pipe. The mechanism for preventing generation of the clearance corrosion is considered to be as follows.

It should be noted that the clearance corrosion is caused by non-uniformity of environment. Specifically, migration of a substance from the outside is inhibited within the clearance so as to lower the dissolved oxygen concentration, with the result that formed is a local cell including the inside of the clearance acting as an anode and the outside acting as a cathode. It follows that anions, i.e., $Cl^-$ ions in many cases, are condensed within the clearance so as to destroy the native oxide film formed on the aluminum surface and, thus, to form aluminum hydroxide. In other words, $OH^-$ ions are consumed to make the inner region of the clearance acidic. It follows that the corrosion is rapidly promoted by chemical dissolution.

In order to suppress the clearance corrosion, the oxide film on the aluminum surface, which has been destroyed by corrosion, should be formed again so as to form a stable passive film on the newly formed oxide film. Where the aluminum alloy contains In or Sn, a stable corrosion product serving to suppress the clearance corrosion is considered to be formed in the initial stage of the corrosion.

b. Aluminum Composite Layer

An aluminum composite layer is intended to improve the corrosion resistance and wear resistance. The composite particles contained in the aluminum composite layer include, for example, carbides such as boron carbide, silicon carbide, titanium carbide, tungsten carbide, and zirconium carbide; oxides such as aluminum oxide, silicon oxide, titanium oxide and zirconium oxide; and organic compounds such as fluorocarbon plastic and polyethylene resin. It is desirable for the aluminum composite layer to contain these composite particles in an amount of 5 to 20 parts by weight relative to 100 parts by weight of aluminum. The aluminum composite layer can be formed by, for example, an electroplating method using a plating bath containing these composite particles. The electroplating method can be performed by using a non-aqueous solution bath such as an organic solvent bath or a molten salt bath.

The aluminum composite layer should desirably have a thickness of at least 3 μm in view of the corrosion resistance and wear resistance. If the thickness is less than 3 μm, scratches or wear reaching the base body of the metal pipe takes place in the aluminum composite layer. On the other hand, if the thickness exceeds 30 μm, the adhesion is markedly lowered. It follows that the thickness of the aluminum composite layer should desirably fall within a range of between 3 μm and 30 μm.

It is also possible to apply a chemical treatment or an anodic oxidation treatment to the surface of the aluminum composite layer to form a chromate film, a zinc phosphate film, etc. on the surface of the aluminum composite layer so as to further improve the corrosion resistance and to impart a wear resistance.

The material of the base body of the metal pipe is not particularly limited in the present invention. For example, various metals such as stainless steel, copper and a copper alloy can be used for forming the base body of the metal pipe in view the various properties required such as mechanical strength, workability, corrosion resistance as well as cost. In the case of using stainless steel, it is desirable to form a nickel layer in a thickness of 0.02 to 2.5 μm on the surface of the base body of the metal pipe, followed by forming the Al-X alloy layer or the aluminum composite layer, as already described in conjunction with the first embodiment.

Also, the optical fiber-housing metal pipe referred to in each of the first embodiment and the second embodiment is not limited in the manufacturing method. For example, the optical fiber can be housed in the metal pipe by means of any of the simultaneous insertion method and the after-insertion method.

An optical grounding wire having a high corrosion resistance and wear resistance can be obtained by stranding a plurality of conductive wires arranged about the optical fiber-housing metal pipe of the present invention having an oxide layer, an aluminum alloy layer or an aluminum composite layer formed on the surface.

Third Embodiment

An optical fiber-housing metal pipe and a method of manufacturing the same according to a third embodiment of the present invention is intended to improve the corrosion resistance by smoothing the surface of an optical fiber-housing metal pipe covered with an aluminum or aluminum alloy layer so as to decrease the surface defect.

The aluminum alloy used in the third embodiment of the present invention contains aluminum and one or two kinds of other elements selected from the group consisting of Mn, Ti, Ni, Cr, Nb, Mg, Fe, In and Sn. The aluminum or aluminum alloy layer can be formed on the surface of the optical fiber-housing metal pipe by means of, for example, a vacuum plating method such as a vapor deposition method, or an ion plating method or an electroplating method using a molten salt bath or an organic solvent bath.

The smoothing method, which is not particularly limited in the present invention, includes, for example, a polishing method for polishing the surface of the metal pipe and a method of spurting particles of metallic or non-metallic material (shot peening method). However, these methods tend to bring about peeling of the aluminum or aluminum alloy layer. Therefore, it is desirable in view of productivity and economy to draw the metal pipe while applying a uniformly pressure to the outer circumferential surface of the metal pipe.

The degree of drawing of the metal pipe is not particularly limited in the present invention. The drawing produces the effect of suppressing the pin hole occurrence and the effect of improving the corrosion resistance derived from the suppressed pin hole occurrence regardless of the degree of drawing. However, in order to markedly improve the corrosion resistance, it is desirable to draw the metal pipe to achieve a change in outer diameter, i.e., ratio of the diameter of the drawn metal pipe to the diameter of the metal pipe before drawing, of 0.05 to 0.8%. If the change in outer diameter is less than 0.05%, the aluminum or aluminum alloy layer cannot be smoothed sufficiently, resulting in failure to suppress sufficiently the pin hole occurrence. If the change in outer diameter exceeds 0.8%, however, the aluminum or aluminum alloy layer is likely to peel off.

As a result of an extensive research on the relationship between the surface roughness of the aluminum or aluminum alloy layer and the pin hole density, it has been found that the pin hole density can be markedly lowered so as to improve prominently the corrosion resistance, if the maximum height ($R_y$) specified in JIS B 0601 is set at 3 $\mu$m or less. In other words, a high corrosion resistance can be obtained by applying a smoothing treatment so as to obtain 3 $\mu$m or less of the maximum height of the aluminum or aluminum layer.

The thickness of the aluminum or aluminum alloy layer is not particularly limited in the present invention. However, if the thickness is less than 7 $\mu$m, such a large number of pin holes occur that it is impossible to deal with the pin hole occurrence problem by the smoothing treatment producing the pin hole suppressing effect. If the thickness exceeds 30 $\mu$m, however, the adhesion is lowered as described previously. It follows that it is desirable for the thickness of the aluminum or aluminum alloy layer to fall within a range of between 7 and 30 $\mu$m.

The material of the metal pipe base body is not particularly limited in the present invention, making it possible to use various metals in view of the various properties required such as the mechanical strength, workability and corrosion resistance as well as cost. In the case of using stainless steel, the aluminum layer formed on the base body is likely to peel off in the smoothing step because the passive film present on the surface of the stainless steel base body causes the adhesion of the aluminum or aluminum alloy layer to the base body to be lowered. Therefore, in the case of using stainless steel for forming the metal pipe, it is desirable to form a nickel layer in direct contact with the metal pipe base body, followed by forming an aluminum layer on the nickel layer. In this case, the influence given by the passive film is suppressed by the presence of the nickel layer so as to improve the adhesion of the aluminum layer to the metal pipe base body. The method of forming the nickel layer is not particularly limited in the present invention. For example, the nickel layer can be formed by a wet process such as an electroless plating or an electrolytic plating. However, it is desirable to use a plating solution having a low pH value such as a strike bath or a borofluoride bath. In this case, the nickel layer can be formed while eluting the passive film present on the surface of the stainless steel base body so as to obtain a high adhesion of the nickel layer itself to the stainless steel base body.

The thickness of the nickel layer is not particularly limited in the present invention. It should be noted that, if the thickness is at least 0.02 $\mu$m, a high adhesion can be imparted to the aluminum layer. If the thickness exceeds 2.5 $\mu$m, however, the passive film on the surface of the stainless steel base body is excessively eluted, with the result that the corrosion resistance of the stainless steel base body is markedly impaired. It follows that it is desirable for the thickness of the nickel layer to fall within a range of between 0.02 $\mu$m and 2.5 $\mu$m.

Figure 1B:
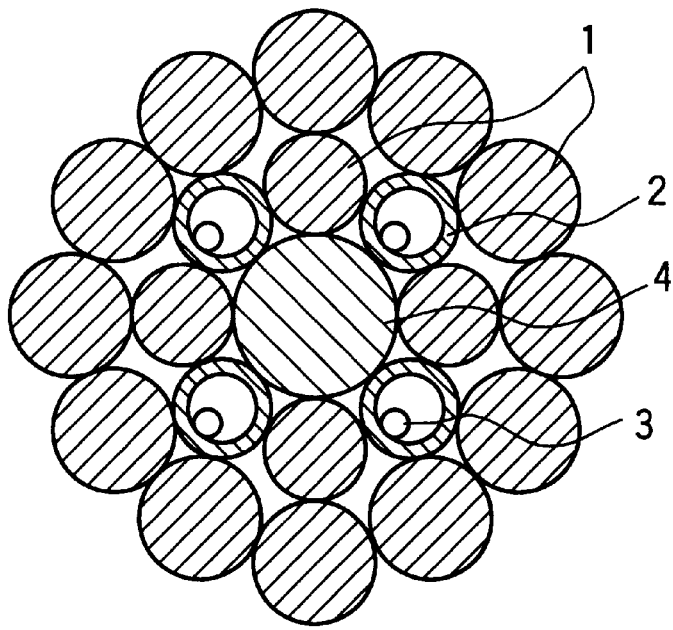
FIG. 1B is a cross sectional view exemplifying that metal pipes each housing an optical fiber and conductive wires are stranded together.
Figure 1C:
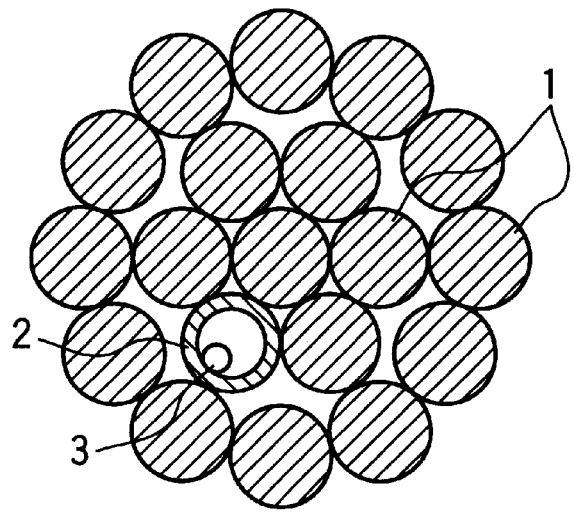
FIG. 1C is a cross sectional view also exemplifying that a metal pipe housing an optical fiber and conductive wires are stranded together.

The manufacturing method of the optical fiber-housing metal pipe is not particularly limited in the present invention. Also, either a simultaneous insertion method or an after-insertion method can be employed for inserting an optical fiber into the metal pipe. An optical grounding wire having a high corrosion resistance can be obtained by stranding a plurality of conductive wires arranged about the surface of the optical fiber-housing metal pipe having a smoothing treatment applied to the surface thereof. FIG. 1 exemplifies the optical grounding wire of the particular construction, wherein FIG. 1A shows that a plurality of conductive wires 1 are arranged on the surface of the metal pipe 2 housing the optical fiber 3, FIG. 1B shows that a plurality of metal pipes 2 each housing the optical fiber 3 and a plurality of conductive wires 1 are alternately arranged on the surface of the inner core 4 to form an inner layer, and a plurality of additional conductive wires 1 are arranged on the outer surface of the inner layer to form an outer layer, and FIG. 1C shows that the metal pipe 2 housing the optical fiber 3 and a plurality of conductive wires 1 are arranged together.

In the present invention, it is desirable to apply a chemical treatment to form a chromate film or a zinc phosphate film or to apply an anodic oxidation to the surface of the metal pipe after the drawing treatment so as to further improve the corrosion resistance of the metal pipe. Particularly, the chromate treatment permits markedly improving the corrosion resistance of the metal pipe.

The prominent effect of the present invention will be demonstrated by the following Examples of the present invention.

EXAMPLE

Example 1

An aluminum layer was formed on the surface of an optical fiber-housing metal pipe prepared by an after-insertion method or simultaneous insertion method, followed by forming an oxide film on the surface of the aluminum layer by the method given below, i.e., chromate treatment: C1 to C3, zinc phosphate treatment; P1, and anodic oxidation treatment: A1 to A6.

The details of the optical fiber-housing metal pipe used were as follows:

Metal Pipe: Made of SUS 304, copper or copper alloy (copper-silver alloy), inner diameter/outer diameter ($\phi$mm)=2.4/2.8);

Optical Fiber: 24 optical fibers ($\phi$250 $\mu$m);

(Chromate Treatment: C1)

Composition of the Treating Solution: $CrO_3$ (2.0 wt % in terms of metal Cr)+HF (0.5 wt %)+water;

Treating Method: Spray coating of the treating solution of 50° C.;

After-treatment: Water wash and, then, drying;

(Chromate Treatment: C2)

Composition of the Treating Solution: $CrO_3$ (2.0 wt % in terms of metal Cr)+HF (0.5 wt %)+$SiO_2$ (8.0 wt %)+water+polyolefin resin (1.0 wt %);

Treating Method: Dipping in the treating solution of 50° C.;

After-treatment: Drying;

(Chromate Treatment: C3)

Composition of the Treating Solution: $CrO_3$ (12 g/L (liter)+75% phosphoric acid (35 mL/L)+NaF.HF (3 g/L);

Treating Method: Spray coating of the treating solution of 50° C.;

After-treatment: Water wash and, then, drying; (Zinc Phosphate Treatment: P1)

Composition of the Treating Solution: $Zn^{2+}$ (0.7%)+ $PO_4^{3-}$ (1.0%)+$NO_3^-$ (2.0%)+$BF_4^-$ (1.0%)+water;

Treating Method: Spray coating of the treating solution of 60° C.;

After-treatment: Water wash and, then, drying; (Anodic Oxidation Treatment: A1)

Electrolyte: 15% sulfuric acid (liquid temperature=10° C.)

Current Density: 2 A/dm$^2$;

Counter Electrode (cathode): Aluminum plate; (Anodic Oxidation Treatment: A2)

Anodic oxidation treatment: After the anodic oxidation treatment A1, dipping in boiling water to seal the pores; (Anodic Oxidation Treatment: A3)

Electrolyte: 4% oxalic acid (liquid temperature=4° C.)

Current Density: 10 A/dm$^2$;

Counter Electrode (cathode): Aluminum plate; (Anodic Oxidation Treatment: A4)

Electrolyte: 25% sodium phosphate (liquid temperature=20° C.)

Current Density: 3 A/dm$^2$;

Counter Electrode (cathode): Aluminum plate; (Anodic Oxidation Treatment: A5)

Anodic oxidation treatment: After the anodic oxidation treatment A4, dipping in a red-series organic dye, followed by pore-sealing treatment under a pressurized steam; (Anodic Oxidation Treatment: A6)

Electrolyte: 15% sulfuric acid (liquid temperature=25° C.)

Current Density: 1.5 A/dm$^2$;

Counter Electrode (cathode): Aluminum plate;

After-treatment: AC electrolysis

Electrolyte: $NiSO_4$ (25 g/L)+$H_3BO_4$ (30 g/L)+$(NH_4)_2SO_4$ (15 g/L) (liquid temperature=20° C.)

Voltage: 15V

Counter Electrode (cathode): Aluminum plate

As shown in Table 1, an oxide layer was formed on the surface of an optical fiber-housing metal pipe covered with an aluminum layer in the Examples of the present invention, i.e., Samples Nos. 1 to 31. In other words, the oxide layer was formed on the aluminum layer formed on the metal pipe base body in the Examples of the present invention. On the other hand, the particular oxide layer was not formed in the Comparative Examples, i.e., samples Nos. 32 to 35. Seven optical fiber-housing metal pipes for each sample were stranded together to form a stranded structure, followed by stranding steel wires each covered with an aluminum layer and arranged on the stranded structure of the optical fiber-housing metal pipes so as to prepare an optical grounding wire. The optical grounding wire thus prepared was weathered for a month in a coast region as an overhead line, followed by taking out the optical grounding wire so as to apply a saline spraying test to the wire for 1,000 hours in accordance with the method specified in JIS Z2371. The saline spraying test permits detecting promptly a defective adhesion and wear caused by rubbing between the conductive wire and the metal pipe or among the metal pipes as well as the corrosion derived from the defective adhesion or wear.

In each of samples Nos. 3–14 and 17–31 of the present invention, a nickel layer was formed on the surface of the optical fiber-housing metal pipe, followed by forming an aluminum layer on the nickel layer. The conditions for forming the nickel layer were as follows:

Electrolyte: $NiCl_2 \cdot 6H_2O$ (250 g/L)+HCl (70 mL/L) (liquid temperature=25° C.)

Current Density: 20 A/dm$^2$

Counter Electrode (Anode): nickel plate

The evaluation tests were conducted as follows:

(Adhesion)

After weathered as an overhead line, the optical grounding wire was decomposed so as to observe the degree of peeling of the aluminum layer formed on the surface of the optical fiber-housing metal pipe. The deterioration of adhesion was evaluated as follows:

○: No peeling;

Δ: Occurrence of pin hole-like peeling (1 mm φ or less);

X: Occurrence of planar peeling.

(Wear Resistance)

After weathered as an overhead line, the optical grounding wire was decomposed so as to observe the inner surface of the conductive wire and the outer surface of the optical fiber-housing metal pipe. The wear resistance was evaluated as follows:

○: No wear;

Δ: Slight wear (metal powder caused by wear was not found);

X: Considerable wear (metal powder caused by wear was found).

(Corrosion Resistance)

After the saline water spraying test, the optical grounding wire was decomposed so as to observe the degree of corrosion occurrence on the conductive wire and on the surface of the optical fiber-housing metal pipe. The corrosion resistance was evaluated as follows:

○○: No rusting at all;

○: Slight rusting;

Δ: Aluminum layer on the surface of the metal pipe or the conductive wire partly disappeared;

X: Aluminum layer on the surface of the metal pipe disappeared completely, or the conductive wire was broken.

The results of the evaluation are also shown in Table 1.

As apparent from Table 1, any of samples Nos. 1 to 31 of the optical fiber-housing metal pipes of the present invention each including the oxide layer was found to be excellent in wear resistance and satisfactory in each of the adhesion and corrosion resistance. Particularly, in each of samples Nos. 3–5, 7, 9–11, 13, 17–20, 22, 23 and 25–31, a nickel layer was formed inside the aluminum layer. In addition, the thickness of each of the aluminum layer and the oxide layer falls within the range specified in the present invention. As a result, the aluminum layer did not peel at all, and the adhesion was quite satisfactory. In addition, these samples were found to be quite satisfactory in corrosion resistance. Specifically, rusting did not occur at all, or rusting occurred only slightly.

It should also be noted that, in samples Nos. 1, 2, 15 and 16, copper or a copper alloy was used as the base body of the optical fiber-housing metal pipe. Also, the thickness of each of the aluminum layer and the oxide layer falls within the range specified in the present invention. As a result, these samples were found to be quite satisfactory in any of the adhesion, wear resistance and corrosion resistance.

On the other hand, samples Nos. 32 to 35 of the optical fiber-housing metal pipes for the Comparative Examples did not include the oxide layer specified in the present invention, leading to a poor wear resistance and a poor corrosion resistance. Particularly, samples Nos. 34 and 35, in which stainless steel was used as the base body of the optical fiber-housing metal pipe and a nickel layer was not formed inside the aluminum layer, were also. poor in adhesion.

TABLE 1

Note: *-marked copper alloy is Cu-Ag alloy

| No. | metal pipe base body | Ni layer thickness | Al layer thickness | oxide layer kind | method | film thickness |
|---|---|---|---|---|---|---|
| 1 | copper | none | 15 μm | chromate-treated film | C1 | 200 mg/m² |
| 2 | copper alloy* | none | 15 μm | chromate-treated film | C1 | 200 mg/m² |
| 3 | SUS304 | 0.02 μm | 15 μm | chromate-treated film | C1 | 200 mg/m² |
| 4 | SUS304 | 0.5 μm | 15 μm | chromate-treated film | C1 | 200 mg/m² |
| 5 | SUS304 | 2.5 μm | 15 μm | chromate-treated film | C1 | 200 mg/m² |
| 6 | SUS304 | 0.2 μm | 1 μm | chromate-treated film | C1 | 200 mg/m² |
| 7 | SUS304 | 0.2 μm | 3 μm | chromate-treated film | C1 | 200 mg/m² |
| 8 | SUS304 | 0.2 μm | 15 μm | chromate-treated film | C1 | 20 mg/m² |
| 9 | SUS304 | 0.2 μm | 15 μm | chromate-treated film | C1 | 40 mg/m² |
| 10 | SUS304 | 0.2 μm | 15 μm | chromate-treated film | C1 | 200 mg/m² |
| 11 | SUS304 | 0.2 μm | 15 μm | chromate-treated film | C1 | 400 mg/m² |
| 12 | SUS304 | 0.2 μm | 15 μm | chromate-treated film | C1 | 500 mg/m² |
| 13 | SUS304 | 0.2 μm | 30 μm | chromate-treated film | C1 | 200 mg/m² |
| 14 | SUS304 | 0.2 μm | 35 μm | chromate-treated film | C1 | 200 mg/m² |
| 15 | copper | none | 15 μm | chromate-treated film | C2 | 200 mg/m² |
| 16 | copper alloy* | none | 15 μm | chromate-treated film | C2 | 200 mg/m² |
| 17 | SUS304 | 0.2 μm | 15 μm | chromate-treated film | C2 | 100 mg/m² |
| 18 | SUS304 | 0.2 μm | 15 μm | chromate-treated film | C2 | 200 mg/m² |
| 19 | SUS304 | 0.2 μm | 15 μm | chromate-treated film | C2 | 400 mg/m² |
| 20 | SUS304 | 0.2 μm | 15 μm | chromate-treated film | C3 | 200 mg/m² |
| 21 | SUS304 | 0.2 μm | 15 μm | zinc phosphate-treated film | P1 | 0.3 g/m² |
| 22 | SUS304 | 0.2 μm | 15 μm | zinc phosphate-treated film | P1 | 0.5 g/m² |
| 23 | SUS304 | 0.2 μm | 15 μm | zinc phosphate-treated film | P1 | 8 g/m² |
| 24 | SUS304 | 0.2 μm | 15 μm | anodic oxidation film | A1 | 1 μm |
| 25 | SUS304 | 0.2 μm | 15 μm | anodic oxidation film | A1 | 3 μm |
| 26 | SUS304 | 0.2 μm | 15 μm | anodic oxidation film | A1 | 10 μm |
| 27 | SUS304 | 0.2 μm | 15 μm | aniodic oxidation film (pore-sealing treatment) | A2 | 3 μm |
| 28 | SUS304 | 0.2 μm | 15 μm | anodic oxidation film | A3 | 3 μm |
| 29 | SUS304 | 0.2 μm | 15 μm | anodic oxidation film | A4 | 3 μm |
| 30 | SUS304 | 0.2 μm | 15 μm | anodic oxidation film (pore-sealing treatment) | A5 | 3 μm |
| 31 | SUS304 | 0.2 μm | 15 μm | anodic oxidation film | A6 | 3 μm |
| 32 | copper | none | 15 μm | | none | |
| 33 | copper alloy* | none | 15 μm | | none | |
| 34 | SUS304 | none | 15 μm | | none | |
| 35 | SUS304 | none | 35 μm | | none | |

| No. | outer appearance | adhesion | wear resistance metal pipe | wear resistance conductive wire | corrosion resistance metal pipe | corrosion resistance conductive wire | remarks |
|---|---|---|---|---|---|---|---|
| 1 | yellow | ○ | ○ | Δ | ○○ | ○○ | example |
| 2 | yellow | ○ | ○ | Δ | ○○ | ○○ | example |
| 3 | yellow | ○ | ○ | Δ | ○○ | ○○ | example |
| 4 | yellow | ○ | ○ | Δ | ○○ | ○○ | example |
| 5 | yellow | ○ | ○ | Δ | ○○ | ○○ | example |
| 6 | yellow | ○ | ○ | Δ | Δ | ○ | example |
| 7 | yellow | ○ | ○ | Δ | ○ | ○○ | example |
| 8 | pale yellow | ○ | ○ | Δ | Δ | ○ | example |
| 9 | yellow | ○ | ○ | Δ | ○ | ○○ | example |
| 10 | yellow | ○ | ○ | Δ | ○○ | ○○ | example |
| 11 | orange | ○ | ○ | Δ | ○○ | ○○ | example |
| 12 | orange | ○ | ○ | Δ | ○○ | ○○ | example |
| 13 | yellow | ○ | ○ | Δ | ○○ | ○○ | example |
| 14 | yellow | Δ | ○ | Δ | Δ | ○ | example |
| 15 | yellow | ○ | ○ | ○ | ○○ | ○○ | example |
| 16 | yellow | ○ | ○ | ○ | ○○ | ○○ | example |
| 17 | yellow | ○ | ○ | ○ | ○○ | ○○ | example |
| 18 | yellow | ○ | ○ | ○ | ○○ | ○○ | example |
| 19 | orange | ○ | ○ | ○ | ○○ | ○○ | example |
| 20 | green | ○ | ○ | Δ | ○○ | ○○ | example |
| 21 | gray | ○ | ○ | Δ | Δ | ○ | example |
| 22 | gray | ○ | ○ | Δ | ○ | ○○ | example |
| 23 | gray | ○ | ○ | Δ | ○ | ○○ | example |
| 24 | gray | ○ | ○ | Δ | ○ | ○○ | example |
| 25 | gray | ○ | ○ | Δ | ○○ | ○○ | example |
| 26 | gray | ○ | ○ | Δ | ○○ | ○○ | example |
| 27 | gray | ○ | ○ | Δ | ○○ | ○○ | example |
| 28 | yellow | ○ | ○ | Δ | ○○ | ○○ | example |
| 29 | opaque white | ○ | ○ | Δ | ○○ | ○○ | example |
| 30 | red | ○ | ○ | Δ | ○○ | ○○ | example |

TABLE 1-continued

Note: *-marked copper alloy is Cu-Ag alloy

| 31 | bronze | ○ | ○ | Δ | ○○ | ○○ | example |
| 32 | not colored | ○ | X | Δ | X | X | comparative example |
| 33 | not colored | ○ | X | Δ | X | X | comparative example |
| 34 | not colored | Δ | X | X | X | X | comparative example |
| 35 | not colored | X | X | X | X | X | comparative example |

Example 2

An aluminum alloy layer or an aluminum composite layer was formed as follows on the surface of an optical fiber-housing metal pipe prepared by an after-insertion or simultaneous insertion method. The details of the optical fiber-housing metal pipe used were as follows:

Metal Pipe: Made of SUS304, copper or copper alloy (Cu-Ag alloy); inner diameter/outer diameter ($\phi$mm)= 2.4/2.8;

Optical Fiber: 24 optical fibers ($\phi$250 $\mu$m)

a. Aluminum Alloy Layer

An aluminum alloy layer was formed on the outer surface of an optical fiber-housing metal pipe by a vacuum vapor deposition method or an electroplating method. In the case of employing the vacuum vapor deposition method, the aluminum alloy layer was formed on the outer surface of the optical fiber-housing metal pipe prepared by a simultaneous insertion method. In the case of employing the electroplating method, the aluminum alloy layer was formed on the outer surface of the metal pipe, followed by inserting the optical fiber into the metal pipe by the after-insertion method. The conditions for forming the aluminum alloy layer were as follows:

(Vacuum Vapor Deposition Method)

Pretreatment: Ar ion bombardment

Vapor Depositing Conditions: Co-vapor deposition using two crucibles. Vapor deposition temperature=150° C.

(Electroplating Method)

Electroplating Conditions: The electroplated film was formed under a nitrogen gas atmosphere at a current density of 10 A/dm$^2$.

Plating Bath: A chloride-based molten salt bath (77 wt % AlCl$_3$+14 wt % NaCl+9 wt % KCl) was used as a basic plating bath. The alloy components were dissolved in the basic plating bath by adding metal chlorides to the basic plating bath or by dissolving a metal plate containing the alloy components in the basic plating bath by means of anode dissolution.

Plating Bath Temperature: 210° C.

b. Aluminum Composite Layer

An aluminum composite layer was formed on the outer surface of the optical fiber-housing metal pipe by means of an electroplating. After formation of the aluminum composite layer, an optical fiber was inserted into the metal pipe by means of an after-insertion method. The conditions for forming the aluminum composite layer were as follows:

Plating Bath: A chloride-based molten salt bath (77 wt % AlCl$_3$+14 wt % NaCl+9 wt % KCl) was used as a basic plating bath, and the aluminum composite components were added to the basic plating bath.

Plating Bath Temperature: 210° C.;

Electroplating Conditions: The electroplated film was formed under a nitrogen gas atmosphere at a current density of 10 A/dm$^2$ while stirring the plating bath.

As shown in Table 2, an aluminum alloy layer or an aluminum composite layer was formed on the surface of an optical fiber-housing metal pipe in the Examples of the present invention, i.e., Samples Nos. 1 to 28. On the other hand, a pure aluminum layer was formed on the surface of the optical fiber-housing metal pipe in the Comparative Examples, i.e., samples Nos. 29 to 32. Seven optical fiber-housing metal pipes for each sample were stranded together to form a stranded structure, followed by stranding steel wires each covered with an aluminum layer and arranged on the stranded structure of the optical fiber-housing metal pipes so as to prepare an optical grounding wire. The optical grounding wire thus prepared was weathered for a month in a coast region as an overhead line, followed by taking out the optical grounding wire so as to apply a saline spraying test to the wire for 1,000 hours in accordance with the method specified in JIS Z2371. The saline spraying test permits detecting promptly a defective adhesion and wear caused by rubbing between the conductive wire and the metal pipe or among the metal pipes as well as the corrosion derived from the defective adhesion or wear.

In each of samples Nos. 11 and 28 of the present invention, a chromate layer was formed on the outer surface of the aluminum alloy layer or the aluminum composite layer covering the surface of the optical fiber-housing metal pipe made of stainless steel. The chromate layer was formed as follows:

Composition of Treating Solution: CrO$_3$ (2.0 wt % in terms of metal chromium)+HF (0.5 wt %)+water;

Treating Method: Spray coating of the treating solution at the liquid temperature of 50° C.;

Cr Deposition Amount: 200 mg/m$^2$;

After-treatment: water wash and, then, drying.

In each of samples Nos. 1–8, 11–21 and 24–28 of the present invention, a nickel layer was formed on the surface of the optical fiber-housing metal pipe made of stainless steel, followed by forming the aluminum alloy layer or the aluminum composite layer on the nickel layer. The conditions for forming the nickel layer were as follows:

Electrolyte: NiCl$_2$.6H$_2$O (250 g/L)+HCl (70 mL/L) (liquid temperature=25° C.)

Current Density: 20 A/dm$^2$

Counter Electrode (Anode): nickel plate

The evaluation tests were conducted as follows:

(Adhesion)

After weathered as an overhead line, the optical grounding wire was decomposed so as to observe the degree of peeling of the aluminum alloy or the aluminum composite layer formed on the surface of the optical fiber-housing metal pipe. The deterioration of adhesion was evaluated as follows:

○: No peeling;

Δ: Occurrence of pin hole-like peeling (1 mm $\phi$ or less);

X: Occurrence of planar peeling.

(Wear Resistance)

After weathered as an overhead line, the optical grounding wire was decomposed so as to observe the inner surface of the conductive wire and the outer surface of the optical fiber-housing metal pipe. The wear resistance was evaluated as follows:

○: No wear;

Δ: Slight wear (metal powder caused by wear was not found);

X: Considerable wear (metal powder caused by wear was found).

(Corrosion Resistance)

After the saline water spraying test, the optical grounding wire was decomposed so as to observe the degree of corrosion occurrence on the conductive wire and on the surface of the optical fiber-housing metal pipe. The corrosion resistance was evaluated as follows:

○○: No rusting at all;

○: Slight rusting;

Δ: Aluminum layer on the surface of the metal pipe or the conductive wire partly disappeared;

X: Aluminum layer on the surface of the metal pipe disappeared completely, or the conductive wire was broken.

The results of the evaluation are also shown in Table 2.

As apparent from Table 2, any of samples Nos. 1 to 28 of the present invention, in which an aluminum alloy layer or an aluminum composite layer was formed on the optical fiber-housing metal pipe, was excellent in wear resistance and satisfactory in each of the adhesion and corrosion resistance. Particularly, in samples Nos. 1–8, 11–13, 15, 16, 18–21, 25, 26 and 28, stainless steel was used as the base body of the metal pipe and a nickel layer was formed inside the aluminum alloy or the aluminum composite layer. In addition, the thickness of each of the aluminum alloy layer and the aluminum composite layer falls within a range specified in the present invention. As a result, the aluminum alloy layer and the aluminum composite layer did not peel at all in each of these samples, supporting a very high adhesion of these layers. In addition, these samples were found to be quite satisfactory in corrosion resistance. Specifically, the rusting did not occur at all or occurred only slightly.

In each of samples Nos. 9, 10, 22, and 23 of the present invention, copper or a copper alloy was used as the base body of the optical fiber-housing metal pipe. Also, the thickness of each of the aluminum alloy layer and the aluminum composite layer in these samples falls within the range specified in the present invention. As a result, these samples were found to be excellent in the adhesion and wear resistance and to be quite satisfactory in the corrosion resistance because the rusting occurred only slightly.

On the other hand, a pure aluminum layer was formed in place of the aluminum alloy layer or the aluminum composite layer in samples Nos. 29 to 32 of the Comparative Examples. As a result, these samples were poor in the wear resistance and corrosion resistance. Particularly, a nickel layer was not formed inside the pure aluminum layer in any of samples 31 and 32 of the Comparative Examples, leading to a poor adhesion.

Additional optical grounding wires were prepared by using optical fiber-housing metal pipes made of stainless steel (SUS304), as shown in Table 3. In samples Nos. 1–20 of the present invention shown in Table 3, a nickel layer was formed in direct contact with the outer surface of the stainless steel metal pipe, followed by forming a pure aluminum layer or an aluminum alloy layer on the nickel layer. In samples 21 to 25 of the Comparative Examples shown in Table 3, however, a pure aluminum layer or an aluminum alloy layer was formed in direct contact with the outer surface of the stainless steel metal pipe without forming a nickel layer.

An optical grounding wire was prepared by using any of the samples noted above. After weathered as an overhead line as described previously, the optical grounding wire was decomposed so as to observe the degree of peeling of the aluminum layer formed on the surface of the optical fiber-housing metal pipe. The adhesion of the aluminum layer was evaluated as follows:

○: No peeling;

Δ: Pin hole-like peeling (1 mm φ or less);

X: Planar peeling.

As apparent from Table 3, any of samples Nos. 1–20 of the present invention, in which a nickel layer was formed on the outer surface of the metal pipe made of stainless steel, followed by forming a pure aluminum layer or an aluminum alloy layer on the nickel layer, was satisfactory in the adhesion. Particularly, in samples Nos. 2–4, 6–10 and 12–20 of the present invention, the thickness of each of the nickel layer and the pure aluminum layer or the aluminum alloy layer falls within the range specified in the present invention, with the result that the adhesion was quite satisfactory because the pure aluminum layer or the aluminum alloy layer did not peel at all.

On the other hand, in samples Nos. 21 to 25 of the Comparative Examples, a nickel layer was not formed inside the pure aluminum layer or the aluminum alloy layer, leading to a poor adhesion of the pure aluminum layer or the aluminum alloy layer.

TABLE 2

| | | | aluminum layer | | | |
|---|---|---|---|---|---|---|
| No. | metal pipe base body | Ni layer thickness | kind | film-forming method | film thickness | film composition |
| 1 | SUS304 | 0.2 μm | aluminum alloy layer | vacuum vapor deposition method | 15 μm | Al-15 wt % Mn |
| 2 | SUS304 | 0.2 μm | aluminum alloy layer | vacuum vapor deposition method | 15 μm | Al-15 wt % Ti |
| 3 | SUS304 | 0.2 μm | aluminum alloy layer | vacuum vapor deposition method | 15 μm | Al-15 wt % Ni |
| 4 | SUS304 | 0.2 μm | aluminum alloy layer | vacuum vapor deposition method | 15 μm | Al-15 wt % Cr |
| 5 | SUS304 | 0.2 μm | aluminum alloy layer | vacuum vapor deposition method | 15 μm | Al-15 wt % Nb |
| 6 | SUS304 | 0.2 μm | aluminum alloy layer | vacuum vapor deposition method | 15 μm | Al-15 wt % Mg |
| 7 | SUS304 | 0.2 μm | aluminum alloy layer | electroplating method | 15 μm | Al-0.05 wt % Fe |

TABLE 2-continued

| No. | | | | | | |
|---|---|---|---|---|---|---|
| 8 | SUS304 | 0.2 μm | aluminum alloy layer | vacuum vapor deposition method | 15 μm | Al-15 wt % Fe |
| 9 | copper | 0.2 μm | aluminum alloy layer | vacuum vapor deposition method | 15 μm | Al-15 wt % Fe |
| 10 | copper alloy* | 0.2 μm | aluminum alloy layer | vacuum vapor deposition method | 15 μm | Al-15 wt % Fe |
| 11 | SUS304 | 0.2 μm | aluminum alloy layer | electroplating method | 15 μm | Al-15 wt % Fe |
| 12 | SUS304 | 0.2 μm | aluminum alloy layer | electroplating method | 15 μm | Al-0.05 wt % In |
| 13 | SUS304 | 0.2 μm | aluminum alloy layer | electroplating method | 15 μm | Al-0.05 wt % Sn |
| 14 | SUS304 | 0.2 μm | aluminum alloy layer | vacuum vapor deposition method | 1 μm | Al-15 wt % Fe |
| 15 | SUS304 | 0.2 μm | aluminum alloy layer | vacuum vapor deposition method | 3 μm | Al-15 wt % Fe |
| 16 | SUS304 | 0.2 μm | aluminum alloy layer | vacuum vapor deposition method | 30 μm | Al-15 wt % Fe |
| 17 | SUS304 | 0.2 μm | aluminum alloy layer | vacuum vapor deposition method | 35 μm | Al-15 wt % Fe |
| 18 | SUS304 | 0.2 μm | aluminum alloy layer | electroplating method | 15 μm | Al-0.05 wt % Fe-0.05 wt % Ni |
| 19 | SUS304 | 0.2 μm | aluminum composite layer | electroplating method | 15 μm | Al-10 wt % Al$_2$O$_3$ |
| 20 | SUS304 | 0.2 μm | aluminum composite layer | electroplating method | 15 μm | Al-10 wt % SiC |
| 21 | SUS304 | 0.2 μm | aluminum composite layer | electroplating method | 15 μm | Al-10 wt % PTFE |
| 22 | copper | 0.2 μm | aluminum composite layer | electroplating method | 15 μm | Al-10 wt % PTFE |
| 23 | copper alloy* | 0.2 μm | aluminum composite layer | electroplating method | 15 μm | Al-10 wt % PTFE |
| 24 | SUS304 | 0.2 μm | aluminum composite layer | electroplating method | 1 μm | Al-10 wt % PTFE |
| 25 | SUS304 | 0.2 μm | aluminum composite layer | electroplating method | 3 μm | Al-10 wt % PTFE |
| 26 | SUS304 | 0.2 μm | aluminum composite layer | electroplating method | 30 μm | Al-10 wt % PTFE |
| 27 | SUS304 | 0.2 μm | aluminum composite layer | electroplating method | 35 μm | Al-10 wt % PTFE |
| 28 | SUS304 | 0.2 μm | aluminum composite layer | electroplating method | 15 μm | Al-10 wt % PTFE |
| 29 | copper | 0.2 μm | pure aluminum layer | electroplating method | 15 μm | Al |
| 30 | copper alloy* | 0.2 μm | pure aluminum layer | electroplating method | 15 μm | Al |
| 31 | SUS304 | 0.2 μm | pure aluminum layer | electroplating method | 15 μm | Al |
| 32 | SUS304 | 0.2 μm | pure aluminum layer | electroplating method | 35 μm | Al |

| No. | chromate treatment | adhesion | wear resistance metal pipe | wear resistance conductive wire | corrosion resistance metal pipe | corrosion resistance conductive wire | remarks |
|---|---|---|---|---|---|---|---|
| 1 | none | ○ | ○ | Δ | ○ | ○ | example |
| 2 | none | ○ | ○ | Δ | ○ | ○ | example |
| 3 | none | ○ | ○ | Δ | ○ | ○ | example |
| 4 | none | ○ | ○ | Δ | ○ | ○ | example |
| 5 | none | ○ | ○ | Δ | ○ | ○ | example |
| 6 | none | ○ | ○ | Δ | ○ | ○ | example |
| 7 | none | ○ | ○ | Δ | ○○ | ○ | example |
| 8 | none | ○ | ○ | Δ | ○ | ○ | example |
| 9 | none | ○ | ○ | Δ | ○ | ○ | example |
| 10 | none | ○ | ○ | Δ | ○ | ○ | example |
| 11 | treated | ○ | ○ | ○ | ○○ | ○○ | example |
| 12 | none | ○ | ○ | Δ | ○○ | ○○ | example |
| 13 | none | ○ | ○ | Δ | ○○ | ○○ | example |
| 14 | none | ○ | ○ | Δ | Δ | ○ | example |
| 15 | none | ○ | ○ | Δ | ○ | ○ | example |
| 16 | none | ○ | ○ | Δ | ○ | ○ | example |
| 17 | none | Δ | ○ | Δ | Δ | ○ | example |
| 18 | none | ○ | ○ | Δ | ○○ | ○ | example |
| 19 | none | ○ | ○ | Δ | ○ | ○ | example |
| 20 | none | ○ | ○ | Δ | ○ | ○ | example |
| 21 | none | ○ | ○ | ○ | ○ | ○ | example |
| 22 | none | ○ | ○ | ○ | ○ | ○ | example |
| 23 | none | ○ | ○ | ○ | ○ | ○ | example |

TABLE 2-continued

| | | | | | | | |
|---|---|---|---|---|---|---|---|
| 24 | none | ○ | ○ | ○ | Δ | ○ | example |
| 25 | none | ○ | ○ | ○ | ○ | ○ | example |
| 26 | none | ○ | ○ | ○ | ○ | ○ | example |
| 27 | none | Δ | ○ | ○ | Δ | ○ | example |
| 28 | treated | ○ | ○ | ○ | ○○ | ○○ | example |
| 29 | none | ○ | X | Δ | X | X | comparative example |
| 30 | none | ○ | X | Δ | X | X | comparative example |
| 31 | none | Δ | X | X | X | X | comparative example |
| 32 | none | X | X | X | X | X | comparative example |

Note: *marked copper alloy is Cu—Ag alloy

TABLE 3

| | metal pipe | | aluminum layer | |
|---|---|---|---|---|
| No. | base body | Ni layer thickness | kind | film-forming method |
| 1 | SUS304 | 0.01 μm | pure aluminum layer | electroplating method |
| 2 | SUS304 | 0.02 μm | pure aluminum layer | electroplating method |
| 3 | SUS304 | 0.02 μm | pure aluminum layer | electroplating method |
| 4 | SUS304 | 0.02 μm | pure aluminum layer | electroplating method |
| 5 | SUS304 | 0.02 μm | pure aluminum layer | electroplating method |
| 6 | SUS304 | 0.2 μm | pure aluminum layer | electroplating method |
| 7 | SUS304 | 0.5 μm | pure aluminum layer | electroplating method |
| 8 | SUS304 | 1.0 μm | pure aluminum layer | electroplating method |
| 9 | SUS304 | 1.5 μm | pure aluminum layer | electroplating method |
| 10 | SUS304 | 2.5 μm | pure aluminum layer | electroplating method |
| 11 | SUS304 | 2.8 μm | pure aluminum layer | electroplating method |
| 12 | SUS304 | 0.2 μm | pure aluminum layer | vacuum vapor deposition method |
| 13 | SUS304 | 0.2 μm | aluminum alloy layer | electroplating method |
| 14 | SUS304 | 0.2 μm | aluminum alloy layer | electroplating method |
| 15 | SUS304 | 0.2 μm | aluminum alloy layer | electroplating method |
| 16 | SUS304 | 0.2 μm | aluminum alloy layer | electroplating method |
| 17 | SUS304 | 0.2 μm | aluminum alloy layer | electroplating method |
| 18 | SUS304 | 0.2 μm | aluminum composite layer | electroplating method |
| 19 | SUS304 | 0.2 μm | aluminum composite layer | electroplating method |
| 20 | SUS304 | 0.2 μm | aluminum composite layer | electroplating method |
| 21 | SUS304 | none | pure aluminum layer | electroplating method |
| 22 | SUS304 | none | pure aluminum layer | electroplating method |
| 23 | SUS304 | none | pure aluminum layer | vacuum vapor deposition method |
| 24 | SUS304 | none | pure aluminum layer | electroplating method |
| 25 | SUS304 | none | aluminum alloy layer | electroplating method |

| | aluminum layer | | | |
|---|---|---|---|---|
| No. | film thickness | film composition | adhesion | remarks |
| 1 | 15 μm | Al | Δ | example |
| 2 | 3 μm | Al | ○ | example |
| 3 | 15 μm | Al | ○ | example |
| 4 | 30 μm | Al | ○ | example |
| 5 | 35 μm | Al | Δ | example |
| 6 | 15 μm | Al | ○ | example |
| 7 | 15 μm | Al | ○ | example |
| 8 | 15 μm | Al | ○ | example |
| 9 | 15 μm | Al | ○ | example |
| 10 | 15 μm | Al | ○ | example |
| 11 | 15 μm | Al | ○ | example |
| 12 | 15 μm | Al | ○ | example |
| 13 | 15 μm | Al-15 wt % Mn | ○ | example |
| 14 | 15 μm | Al-0.05 wt % Fe | ○ | example |
| 15 | 15 μm | Al-15 wt % Fe | ○ | example |
| 16 | 15 μm | Al-0.05 wt % In | ○ | example |
| 17 | 15 μm | Al-0.05 wt % Sn | ○ | example |
| 18 | 15 μm | Al-10 wt % $Al_2O_3$ | ○ | example |
| 19 | 15 μm | Al-10 wt % SiC | ○ | example |
| 20 | 15 μm | Al-10 wt % PTFE | ○ | example |
| 21 | 3 μm | Al | X | comparative example |
| 22 | 15 μm | Al | X | comparative example |
| 23 | 15 μm | Al | X | comparative example |
| 24 | 35 μm | Al | X | comparative example |
| 25 | 15 μm | Al-0.05 wt % Fe | X | comparative example |

Example 3

An aluminum layer or an aluminum alloy layer was formed on a metal pipe having an optical fiber housed therein by an after-insertion method or a simultaneous insertion method, followed by smoothing the surface of the aluminum or aluminum alloy layer as follows. The details of the optical fiber-housing metal pipe were as follows:

Metal Pipe: Made of SUS304, copper or a copper alloy (Cu-Ag alloy); inner diameter/outer diameter (ϕmm)= 2.4/2.8;

Optical Fiber: 24 optical fibers (ϕ250 μm);

(Shot Peening Method)

The surface of the metal pipe was sprayed with alumina particles having a particle diameter of 5 mm at a speed of 30 m/sec.

(Pipe Drawing Method)

The metal pipe was drawn while uniformly applying pressure to the outer circumferential surface of the metal pipe.

As shown in Table 4, the smoothing treatment given above was applied to some of the samples including an optical fiber-housing metal pipe having the surface covered with an aluminum or aluminum alloy layer, and no smoothing treatment was applied to the other samples. A saline water spraying test was applied to these samples for 1,000 hours and, then, the outer appearance of the sample was observed so as to evaluate the corrosion resistance. The corrosion resistance was evaluated as follows:

○○: No rusting at all;

○: Slight rusting;

Δ: Aluminum layer partly disappeared;

X: Aluminum layer disappeared completely.

In some of the samples including an optical fiber-housing metal pipe made of stainless steel, a nickel layer was formed inside the aluminum layer. The nickel layer was formed under the conditions given below:

Electrolyte: $NiCl_2 \cdot 6H_2O$ (250 g/L)+HCl (70 mL/L); liquid temperature=25° C.;

Current Density: 20 $A/dm^2$;

Counter Electrode (Anode): Nickel plate

TABLE 4

| No. | metal pipe base body | Ni layer thickness | Al or Al alloy layer kind | film thickness | after-treatment | smoothing method |
|---|---|---|---|---|---|---|
| 1 | SUS304 | none | Al | 15 μm | none | shot peening method |
| 2 | SUS304 | none | Al | 15 μm | none | shot peening method |
| 3 | SUS304 | none | Al | 15 μm | none | shot peening method |
| 4 | SUS304 | none | Al | 15 μm | chromate treatment | shot peening method |
| 5 | SUS304 | 0.2 μm | Al | 15 μm | none | shot peening method |
| 6 | SUS304 | none | Al | 15 μm | none | shot peening method |
| 7 | SUS304 | none | Al | 15 μm | none | shot peening method |
| 8 | SUS304 | none | Al | 15 μm | none | pipe drawing method |
| 9 | SUS304 | none | Al | 15 μm | chromate treatment | pipe drawing method |
| 10 | SUS304 | 0.02 μm | Al | 15 μm | none | pipe drawing method |
| 11 | SUS304 | 0.2 μm | Al | 15 μm | none | pipe drawing method |
| 12 | SUS304 | 0.2 μm | Al | 15 μm | chromate treatment | pipe drawing method |
| 13 | SUS304 | 0.5 μm | Al | 15 μm | none | pipe drawing method |
| 14 | SUS304 | none | Al-0.05 wt % Fe | 15 μm | none | pipe drawing method |
| 15 | SUS304 | none | Al | 15 μm | none | pipe drawing method |
| 16 | SUS304 | none | Al | 15 μm | none | pipe drawing method |
| 17 | SUS304 | none | Al | 15 μm | none | pipe drawing method |
| 18 | SUS304 | none | Al | 5 μm | none | pipe drawing method |
| 19 | SUS304 | none | Al | 7 μm | none | pipe drawing method |
| 20 | SUS304 | none | Al | 30 μm | none | pipe drawing method |
| 21 | SUS304 | none | Al | 35 μm | none | pipe drawing method |
| 22 | SUS304 | none | Al | 40 μm | none | pipe drawing method |
| 23 | SUS304 | none | Al | 45 μm | none | pipe drawing method |
| 24 | SUS304 | none | Al | 50 μm | none | pipe drawing method |
| 25 | SUS304 | none | Al | 15 μm | none | none |
| 26 | copper | none | Al | 15 μm | none | shot peening method |
| 27 | copper | none | Al | 15 μm | none | pipe drawing method |
| 28 | copper alloy* | none | Al | 15 μm | none | pipe drawing method |
| 29 | copper | none | Al | 15 μm | chromate treatment | pipe drawing method |
| 30 | copper alloy* | none | Al | 15 μm | chromate treatment | pipe drawing method |
| 31 | copper | none | Al-0.05 wt % Fe | 15 μm | chromate treatment | pipe drawing method |
| 32 | copper | none | Al | 15 μm | none | pipe drawing method |
| 33 | copper | none | Al | 15 μm | none | pipe drawing method |
| 34 | copper | none | Al | 15 μm | none | none |
| 35 | copper alloy* | none | Al | 15 μm | none | none |

TABLE 4-continued

| No. | change in outer diameter | maximum height | corrosion resistance | remarks |
|---|---|---|---|---|
| 1 | 0.03% | 3.2 μm | Δ | example |
| 2 | 0.05% | 2.0 μm | ○ | example |
| 3 | 0.20% | 1.0 μm | ○ | example |
| 4 | 0.20% | 1.0 μm | ○○ | example |
| 5 | 0.20% | 1.0 μm | ○○ | example |
| 6 | 0.80% | 0.3 μm | ○ | example |
| 7 | 1.00% | 0.1 μm | Δ | example |
| 8 | 0.20% | 1.0 μm | ○ | example |
| 9 | 0.20% | 1.0 μm | ○○ | example |
| 10 | 0.30% | 1.0 μm | ○○ | example |
| 11 | 0.30% | 1.0 μm | ○○ | example |
| 12 | 0.30% | 1.0 μm | ○○ | example |
| 13 | 0.30% | 1.0 μm | ○○ | example |
| 14 | 0.30% | 1.0 μm | ○○ | example |
| 15 | 0.03% | 3.2 μm | Δ | example |
| 16 | 0.05% | 2.0 μm | ○ | example |
| 17 | 0.80% | 0.3 μm | ○○ | example |
| 18 | 0.80% | 0.1 μm | ○ | example |
| 19 | 0.80% | 0.2 μm | ○○ | example |
| 20 | 0.80% | 0.9 μm | ○○ | example |
| 21 | 0.80% | 2.5 μm | ○ | example |
| 22 | 0.80% | 3.0 μm | ○ | example |
| 23 | 0.80% | 3.5 μm | Δ | example |
| 24 | 0.80% | 4.0 μm | Δ | example |
| 25 | 0 | 5.0 μm | X | comparative example |
| 26 | 0.03% | 3.2 μm | Δ | example |
| 27 | 0.30% | 1.5 μm | ○ | example |
| 28 | 0.30% | 1.5 μm | ○ | example |
| 29 | 0.30% | 1.5 μm | ○○ | example |
| 30 | 0.30% | 1.5 μm | ○○ | example |
| 31 | 0.30% | 1.5 μm | ○○ | example |
| 32 | 0.05% | 2.0 μm | ○ | example |
| 33 | 0.80% | 0.5 μm | ○○ | example |
| 34 | 0 | 5.0 μm | X | comparative example |
| 35 | 0 | 6.0 μm | X | comparative example |

Note: *marked copper alloy is Cu—Ag alloy

Industrial Applicability

As described above, the present invention provides an optical fiber-housing metal pipe having the surface covered first with an aluminum layer, which is intended to improve the corrosion resistance, and, then, with an oxide layer, which is intended to impart a wear resistance and to further improve the corrosion resistance. Further, the surface of the optical fiber-housing metal pipe can be colored, making it possible to distinguish easily the optical fiber-housing metal pipe in the manufacture of an optical grounding wire including a plurality of optical fiber-housing metal pipes and in connecting the optical fibers.

The present invention also provides an optical fiber-housing metal pipe having the surface covered with an aluminum alloy or aluminum composite layer, which is intended to improve the corrosion resistance and wear resistance.

Further, the present invention provides an optical fiber-housing metal pipe having the surface covered with a metal layer, which is intended to improve the corrosion resistance, and having a smoothing treatment applied to the surface of the metal layer so as to further improve the corrosion resistance of the optical fiber-housing metal pipe.

What is claimed is:

1. An optical fiber-housing metal pipe, comprising a base body of an optical fiber-housing metal pipe, an aluminum layer formed on the surface of the base body, and an oxide layer formed on the aluminum layer, said oxide layer serving to improve the corrosion resistance and wear resistance of the optical fiber-housing metal pipe.

2. The optical fiber-housing metal pipe according to claim 1, wherein said aluminum layer has a thickness of 3 to 30 μm.

3. The optical fiber-housing metal pipe according to claim 1, wherein said oxide layer is selected from the group consisting of a chromate-treated film, a zinc phosphate film and an anodic oxidation film.

4. The optical fiber-housing metal pipe according to claim 3, wherein said chromate-treated film includes resin and/or oxide sol.

5. The optical fiber-housing metal pipe according to claim 3, wherein the metal chromium deposition amount in said chromate-treated film is 20 to 400 mg/m$^2$.

6. The optical fiber-housing metal pipe according to claim 3, wherein the deposition amount of said zinc phosphate film is 0.5 to 8 g/m$^2$.

7. The optical fiber-housing metal pipe according to claim 3, wherein said anodic oxidation film has a thickness of 3 to 10 μm.

8. The optical fiber-housing metal pipe according to claim 3, wherein a coloring material is adsorbed on the surface of said anodic oxidation film.

9. The optical fiber-housing metal pipe according to claim 3, wherein a pore-sealing treatment is applied to said anodic oxidation film.

10. The optical fiber-housing metal pipe according to claim 1, wherein stainless steel is used as the base body of said optical fiber-housing metal pipe, and a nickel layer is formed inside the aluminum layer.

11. The optical fiber-housing metal pipe according to claim 10, wherein said nickel layer has a thickness of 0.02 to 2.5 μm.

12. The optical fiber-housing metal pipe according to claim 1, wherein a plurality of stranded conductive wires are arranged on the outer circumferential surface of said optical fiber-housing metal pipe.

13. An optical fiber-housing metal pipe, comprising a base body of said metal pipe, and an Al-based composite layer formed on the surface of said metal pipe base body, said composite layer containing at least one kind of a component selected from the group consisting of a carbide, an oxide and an organic compound.

14. The optical fiber-housing metal pipe according to claim 13, wherein stainless steel is used as the base body of said optical fiber-housing metal pipe, and a nickel layer is formed inside the composite layer.

15. The optical fiber-housing metal pipe according to claim 13, wherein said composite layer has a thickness of 3 to 30 $\mu$m.

16. An optical fiber-housing metal pipe, comprising a base body of the optical fiber-housing metal pipe, a nickel layer formed on the surface of the base body, and an aluminum layer formed on the surface of the nickel layer.

17. An optical fiber-housing metal pipe, comprising a base body of an optical fiber-housing metal pipe, and an aluminum or aluminum alloy layer formed on the surface of the metal pipe base body, a maximum height ($R_y$) of said aluminum or aluminum alloy layer being 3 $\mu$m or less.

18. The optical fiber-housing metal pipe according to claim 17, wherein said aluminum or aluminum alloy layer has a thickness of 7 to 30 $\mu$m.

19. The optical fiber-housing metal pipe according to claim 17, wherein stainless steel is used as the base body of said metal pipe, and a nickel layer is formed inside said aluminum or aluminum alloy layer.

20. The optical fiber-housing metal pipe according to claim 19, wherein said nickel layer has a thickness of 0.02 to 2.5 $\mu$m.

21. The optical fiber-housing metal pipe according to claim 17, wherein a chromate-treated film is formed on said aluminum or aluminum alloy layer.

22. The optical fiber-housing metal pipe according to claim 17, wherein a plurality of stranded conductive wires are arranged on the outer circumferential surface of the optical fiber-housing metal pipe.

23. An optical fiber-housing metal pipe, comprising a base body of an optical fiber-housing metal pipe, an Al-X alloy layer formed on the surface of the base body, where X is one or two kinds of elements selected from the group consisting of 0.5 wt % $\leq$Mn$\leq$50 wt %, 0.1 wt % $\leq$Ti$\leq$80 wt %, 0.05 wt % $\leq$Ni$\leq$40 wt %, 1.0 wt % $\leq$Cr$\leq$30 wt %, 1.0 wt % $\leq$Nb$\leq$30 wt %, 0.1 wt % $\leq$Mg$\leq$70 wt %, 0.05 wt % $\leq$Fe$\leq$20 wt %, 0.05 wt % $\leq$In$\leq$1.0 wt %, and 0.05 wt % $\leq$Sn$\leq$1.0 wt %.

24. The optical fiber-housing metal pipe according to claim 23, wherein said Al-X alloy layer has a thickness of 3 to 30 $\mu$m.

25. An optical fiber-housing metal pipe comprising a base body of an optical fiber-housing metal pipe, an Al-X alloy layer formed on the surface of the base body, where X is one or two kinds of elements selected from the group consisting of 0.5 wt % $\leq$Mn$\leq$50 wt %, 0.1 wt % $\leq$Ti$\leq$80 wt %, 0.05 wt % $\leq$Ni$\leq$40wt %, 1.0 wt % $\leq$Cr$\leq$30 wt %, 1.0 wt % $\leq$Nb$\leq$30 wt %, 0.1 wt %. $\leq$Mg$\leq$70 wt %,0.05 wt % $\leq$Fe$\leq$20 wt %, 0.05 wt % $\leq$In$\leq$1.0 wt %, and 0.05 wt % $\leq$Sn$\leq$1.0wt % wherein the base body of the optical fiber-housing metal pipe is stainless steel, and a nickel layer is formed inside the Al-X alloy layer.

26. An optical fiber-housing metal pipe comprising a base body of an optical fiber-housing metal pipe, an Al-X alloy layer formed on the surface of the base body, where X is one or two kinds of elements selected from the group consisting of 0.5 wt % $\leq$Mn$\leq$50 wt %, 0.1 wt % $\leq$Ti$\leq$80 wt %, 0.05 wt % $\leq$Ni$\leq$40 wt %, 1.0 wt % $\leq$Cr$\leq$30 wt %, 1.0 wt % $\leq$Nb$\leq$30 wt %, 0.1 wt % $\leq$Mg$\leq$70 wt %, 0.05 wt % $\leq$Fe$\leq$20 wt %, 0.05 wt % $\leq$In$\leq$1.0 wt %, and 0.05 wt % $\leq$Sn$\leq$1.0 wt % wherein the base body of the optical fiber-housing metal pipe is stainless steel, and a nickel layer 0.02 to 2.5 $\mu$m thick is formed inside the Al-X alloy layer.

27. A method of manufacturing an optical fiber-housing metal pipe excellent in corrosion resistance, comprising:

the step of forming an aluminum or aluminum alloy layer on the surface of a base body of an optical fiber-housing metal pipe; and the step of smoothing the aluminum or aluminum alloy layer by drawing said metal pipe.

28. The method of manufacturing an optical fiber-housing metal pipe according to claim 27, wherein said metal pipe is drawn in said drawing step to bring about a change in the outer diameter of the metal pipe of 0.05 to 0.8%.

* * * * *